(12) United States Patent
Morris et al.

(10) Patent No.: US 7,840,899 B2
(45) Date of Patent: Nov. 23, 2010

(54) STRATEGIES FOR NAVIGATING THROUGH A LIST

(75) Inventors: Ronald A. Morris, San Francisco, CA (US); Jonathan L. Conradt, San Jose, CA (US); Yi Linda Chan, San Jose, CA (US); David H. Sloo, Menlo Park, CA (US); Keith K. Okabe, San Mateo, CA (US)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 11/422,027

(22) Filed: Jun. 2, 2006

(65) Prior Publication Data
US 2008/0126996 A1  May 29, 2008

(51) Int. Cl.
*G06F 15/177* (2006.01)
*G06F 3/00* (2006.01)

(52) U.S. Cl. .......... 715/734; 715/721
(58) Field of Classification Search .......... 715/721, 715/734
See application file for complete search history.

(56) References Cited

U.S. PATENT DOCUMENTS

| | | | | |
|---|---|---|---|---|
| 5,953,017 | A * | 9/1999 | Beach et al. | 345/440 |
| 6,040,829 | A * | 3/2000 | Croy et al. | 715/864 |
| 6,204,840 | B1 | 3/2001 | Petelycky et al. | |
| 6,204,846 | B1 * | 3/2001 | Little et al. | 715/784 |
| 6,288,718 | B1 * | 9/2001 | Laursen et al. | 715/800 |
| 6,483,508 | B1 * | 11/2002 | Ishikawa | 345/420 |
| 6,484,190 | B1 * | 11/2002 | Cordes et al. | 715/207 |
| 6,741,655 | B1 | 5/2004 | Chang et al. | |
| 7,120,472 | B2 * | 10/2006 | Okagaki | 455/566 |
| 7,475,359 | B2 * | 1/2009 | Hudson, Jr. | 715/777 |
| 7,475,365 | B2 * | 1/2009 | Nan et al. | 715/854 |
| 7,490,289 | B2 * | 2/2009 | Hintermeister et al. | 715/234 |
| 7,519,923 | B2 * | 4/2009 | Peterson et al. | 715/854 |
| 2002/0054119 | A1 * | 5/2002 | Dow et al. | 345/772 |
| 2002/0170062 | A1 | 11/2002 | Chen et al. | |
| 2003/0123726 | A1 | 7/2003 | Suh | |
| 2003/0128301 | A1 | 7/2003 | Tarr et al. | |

(Continued)

OTHER PUBLICATIONS

Chau, et al., "A Video Retrieval and Sequencing System," ACM Transactions on Information Systems, vol. 13, No. 4, Oct. 1995, pp. 373-407.

(Continued)

*Primary Examiner*—Dennis-Doon Chow
*Assistant Examiner*—Le Nguyen
(74) *Attorney, Agent, or Firm*—Lee & Hayes, PLLC

(57) ABSTRACT

A list navigation module (LNM) is described that allows a user to navigate among a filtered list of items, yet, in addition, also discover items within an original list items. In operation, a user inputs a search selection, which prompts the LNM to cull a filtered list of items from the original set of items. When the user enters navigation selections of a first kind, the LNM advances to only items in the filtered list. When the user enters navigation selections of a second kind, the LNM advances to items in the unfiltered original list. Further, when the user attempts to navigate past an end of the presented filtered list, the LNM advances to items in the unfiltered original list. The LNM can provide a visual indicator which conveys that one or more items in the original list of items do not appear in the filtered list of items.

20 Claims, 13 Drawing Sheets

U.S. PATENT DOCUMENTS

| | | | |
|---|---|---|---|
| 2004/0193600 A1* | 9/2004 | Kaasten et al. | 707/7 |
| 2006/0008150 A1 | 1/2006 | Zhao et al. | |
| 2006/0013461 A1 | 1/2006 | Park et al. | |
| 2009/0279549 A1* | 11/2009 | Ramanathan et al. | 370/395.4 |

OTHER PUBLICATIONS

Hua, et al., "Detecting Video Shot Boundaries up to 16 times Faster," ACM Multimedia 2000, Los Angeles, CA, USA, pp. 385-387.

Izquierdo, "Linear and Nonlinear Scale-Spaces for Video indexing and Retrieval," IEEE Eplore abstract, available at <<http://ieeexplore.ieee.org/search/srchabstract.jsp?arnumber=847058&isnumber=1834>>, accessed on Feb. 27, 2006, 2 pages.

Lee, et al., "Automatic Video Summarizing Tool using MPEG-7 Descriptors for Personal Video Recorder," IEEE Transaction on Consumer Electronics, vol. 49, No. 3, Aug. 2003, pp. 742-749.

* cited by examiner

•
•
•
•

Shakespeare's Turn of the Shrew
Shoulder to Shoulder: Stories of WWII Heroes
Shtick Monkeys Comedy Program
Shudder in the Night: Mystery Series
Simper Fie: A Marine's Story
Simpalico Sisters: Comedy Show
Simple Truths: News at 7
Smart Thinking about Your Investments
Smurf's Kids Program
Spain on a Shoestring Budget
Spelling Bee
Sticks and Stones
Syracuse University Orangemen Highlights
Take Care of My Heart

Shakespeare's Turn of the Shrew
Shoulder to Shoulder: Stories of WWII Heroes

 (4) Not Shown

Simple Truths: News at 7
Smart Thinking about Your Investments

 (5) Not Shown

Take Care of My Heart

Shakespeare's Turn of the Shrew
Shoulder to Shoulder: Stories of WWII Heroes
Simple Truths: News at 7
Smart Thinking about Your Investments
Take Care of My Heart

STRATEGIES FOR NAVIGATING THROUGH A LIST

BACKGROUND

A well known type of search tool allows a user to investigate an original list of items by generating a smaller filtered list of items. The filtered list of items is culled from the original list of items. In operation, a user can enter a search selection, which prompts the tool to generate a filtered list of items, where each item in the filtered list of items matches the search selection. For example, suppose that the original list includes a list of restaurants in a particular city. The user may receive a filtered list of restaurants that begin with the letter "G" by entering this character as a search selection. The tool then allows the user to navigate within the filtered list of items by moving "up" and "down" within the filtered list, such as by entering corresponding up and down navigational instructions.

While the above-described tool is helpful, it is not without its shortcomings. As appreciated by the present inventors, in the course of moving through the filtered list of items, the user may wish to expand his or her search by investigating items in the original list of items that do not appear in the filtered list of items. However, known tools do not allow the user to efficiently transition from the filtered list of items to the original list of items. For example, if the user wishes to examine the original list of items, the user may abandon the filtered list of items, activate the entire original list of items, and manually navigate down through the original list until she finds a desired item. Or the user may attempt to restructure the filtered list of items by entering a new search selection, which may result in the selection of a more satisfactory filtered list items. The above-described strategies for navigating within original and filtered lists of items may be cumbersome, possibly resulting in various inefficiencies and poor user experience.

For at least the above-stated exemplary reasons, there is a need for more effective techniques for finding items within a list of items.

SUMMARY

The following description sets forth a list navigation module (LNM) that allows a user a user to navigate among a filtered list of items. At the same time, the LNM allows a user to discover items within an original list items. In one exemplary and non-limiting implementation, the items may contain alphanumeric information pertaining to media resources. For example, the items may comprise an ordered list of media resource titles, media resource artists, and so on.

In operation, a user inputs a search selection, which prompts the LNM to cull a filtered list of items from the original list of items. That is, the items in the filtered list of items comprise items in the original list of items which satisfy the search selection. In addition, the LNM can provide a visual indicator which conveys that one or more items in the original list of items do not appear in the filtered list of items. The visual indicator can also have a characteristic which visually reflects a number of items from the original list of items that do not appear in the filtered list of items.

The user can navigate within the filtered list of items by making navigation selections. When the user enters navigation selections of a first kind, the LNM advances to only items in the filtered list. When the user enters navigation selections of a second kind, the LNM advances to items in the unfiltered original list, independent of whether these items are also members of the filtered list. In one exemplary and non-limiting implementation, the selections of the first and second kinds correspond to instructions to advance in first and second directions (e.g., up and down) within the filtered list. Thus, by moving down through the list, a user can advance to only items in the filtered list, and by moving up through the list, a user can advance to any item in the original list, including items that are not currently being displayed. Upon revealing a previously non-displayed item, this item effectively becomes a member of the filtered list of items. As another feature, when the user navigates past an end of the displayed filtered list, the LNM advances to items in the original list, independent of whether these items are members of the filtered list. Thus, the end-of-list behavior is the same as that produced by the above-described second kind of navigation selection.

The strategy employed by the LNM confers various benefits. According to one benefit, the LNM provides a flexible navigation strategy that allows a user to investigate items outside the bounds of a filtered set of items, but without executing a completely new search. This flexibility may result in improved navigation efficiency and better user navigation experience.

The subject matter set forth in this Summary section refers to exemplary manifestations of the invention, and hence does not limit the scope of the invention set forth in the Claims section.

BRIEF DESCRIPTION OF THE DRAWINGS

FIGS. 6-8 show alternative visual indicators that can used in the filtered list of items to convey that the filtered list omits one or more items from the original list of items.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth functionality for navigating through a list of items. The terms "items" has broad connotation. In the examples most commonly evoked herein, an item corresponds to alphanumeric information that pertains to a media resource, such as titles of video programs, artists that appear in movies, and so on. However, it is to be understood that the strategies described herein can be applied to any type of content that can be arranged in a list.

A. Exemplary Appearance and Behavior of the User Interface Presentations (FIGS. 1-8)

A.1. Overview of Exemplary User Interface Behavior (FIGS. 1-5)

In the following discussion, the functionality that implements navigation within a list of items is referred to as a list navigation module, referred to for brevity by the abbreviation LNM. This section (Section A) explains the LNM in the context of the user interface presentations that it produces. The next section (Section B) describes the exemplary structural composition of the LNM. The last section (Section C) describes the procedural aspects of the LNM in flowchart form.

Figure 1:
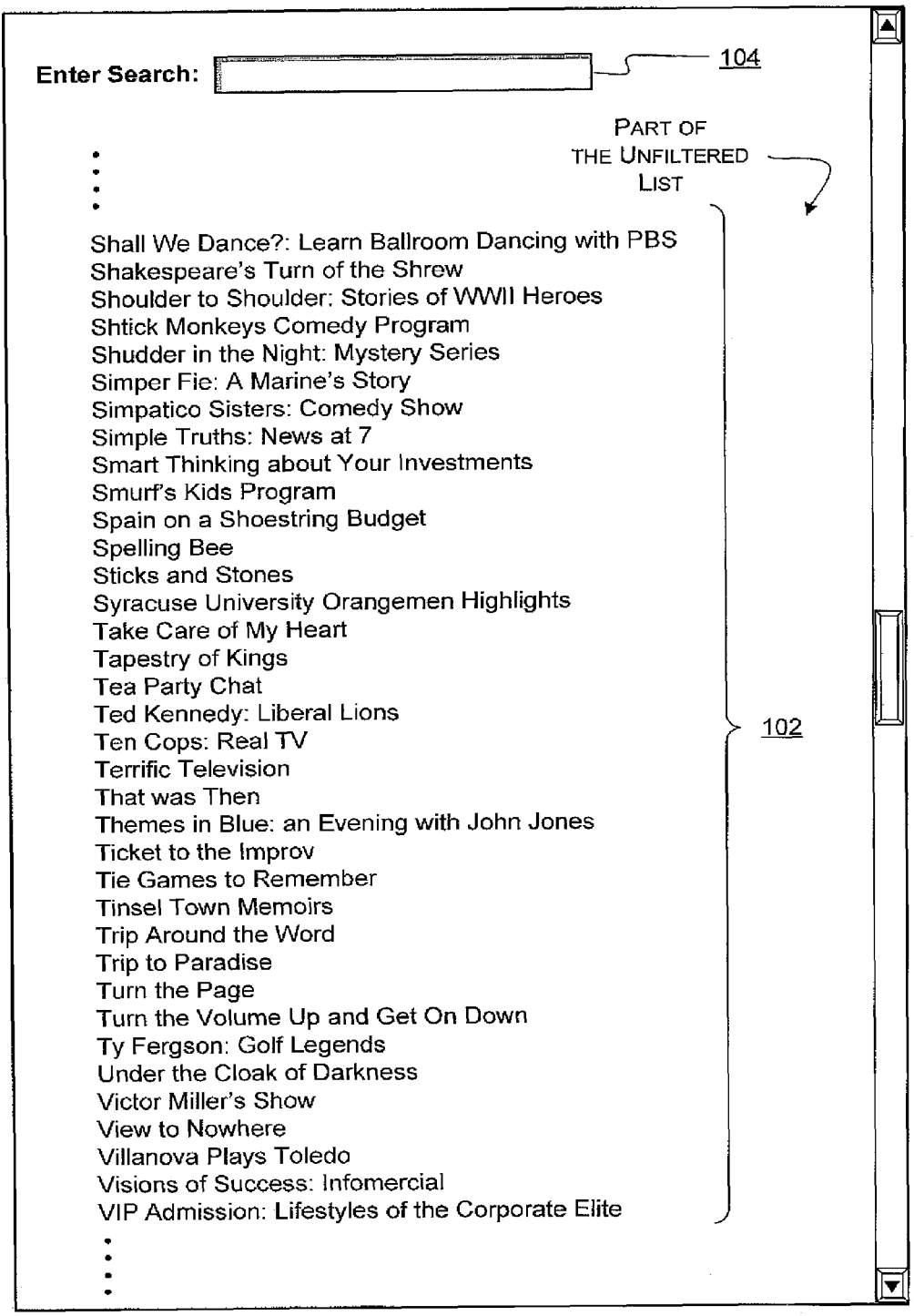
FIG. 1 shows a user interface presentation that displays part of an original list of items.

FIG. 1 shows a user interface presentation 100 that can be generated by the LNM. The user interface presentation 100 shows part of an original list of items 102. In this particular example, the items correspond to respective titles of television programs that a user may select and view. The items are placed in an alphabetical order based on the first character of the first word in the program title. In this particular example, the user interface presentation 100 shows items having titles which begins with the letters S, T, U, and V. The user may scroll down to view other parts of the original list of items 102.

Those skilled in the art will appreciate that the LNM can be applied to lists that contain items of any nature. Further, the LNM can be applied to lists that are ordered based on any criterion or combination of criteria. For example, the LNM can be applied to lists that are ordered based on attributes associated with the items that do not have a visual counterpart in terms of the information that is displayed to the user. Further still, the LNM can be applied to lists that are presented to the user in potentially non-visual formats, such as an audio delivery of items. For instance, an automated telephone information service can incorporate an audio-enabled LNM.

The user interface presentation 100 can include any kind of input interface 104 for receiving a search selection. The LNM uses the search selection to cull a subset of items in the original list of items 102 that match the search selection. In the present representative example, the LNM allows a user to enter a search selection in the form of one or more alphanumeric characters. The LNM responds by culling a subset of items that include the entered alphanumeric characters as initial characters in any word of the items. Again, this selection behavior is to be understood as merely representative. The LNM can be configured to apply any kind of filtering behavior based on any rule or combination of rules. For example, the user can make a search selection in the form of an attribute that does not have a visual counterpart in the original list 102 as displayed. For example, the user can enter a search selection which instructs the LNM to cull a filtered list of movies that are rated PG-13, even though the list 102 itself only displays the titles of the movies, not the ratings of the movies. This is also an example in which the search selection (rating of the movie) may be unrelated to the criterion used to order the list (e.g., based on alphabetical order). In an audio application, the user may enter a search selection by voicing this selection, and a voice recognition mechanism can receive the spoken selection. In any event, the subset of items that match the search selection is referred to herein as a filtered list of items.

Figure 2:
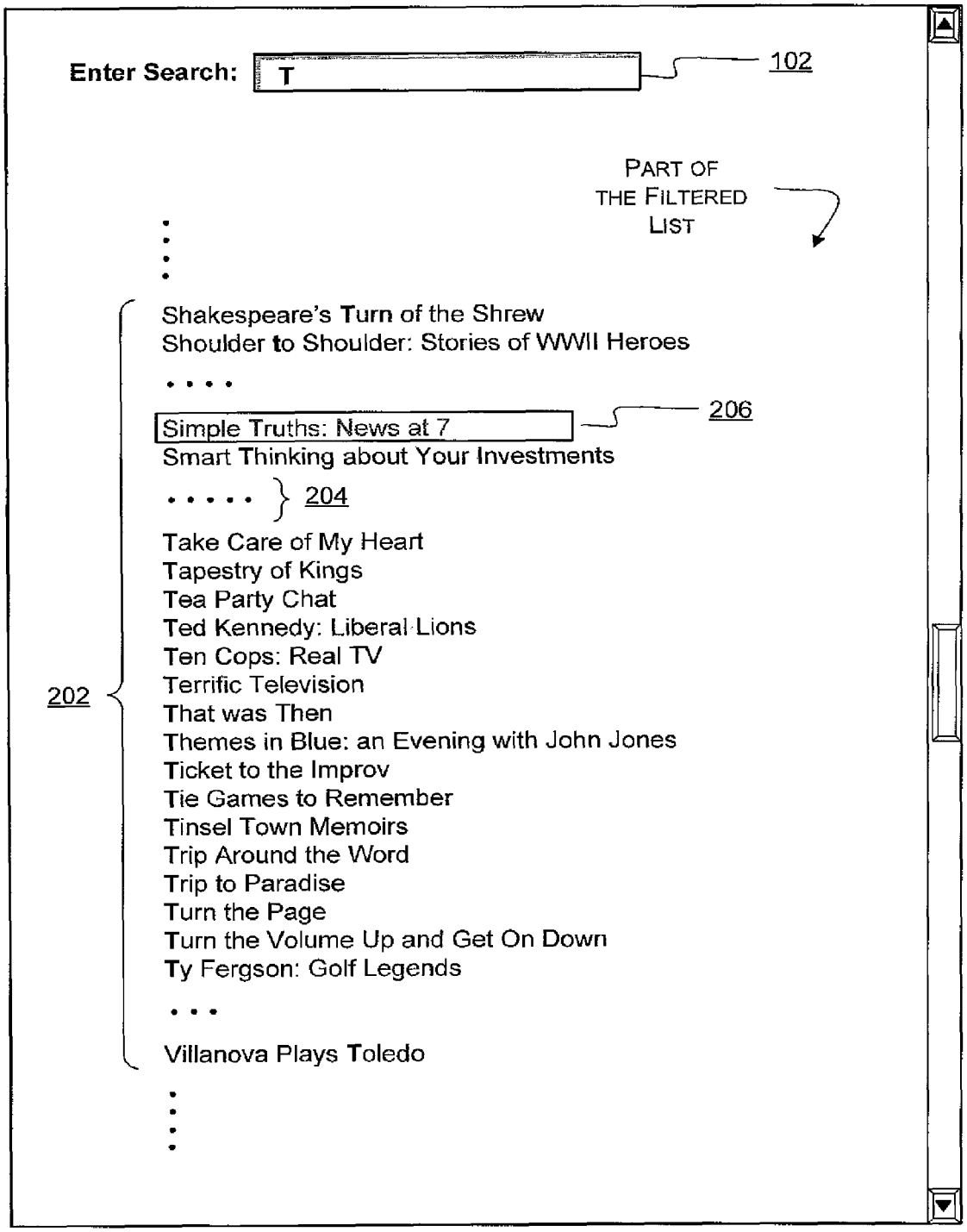
FIG. 2 shows a user interface presentation that displays a filtered list of items upon input of a search selection.

FIG. 2 shows part of a filtered list of items 202 that the LNM produces in response to the user entering the letter "T" into the input interface 104. The filtered list of items 202 accordingly includes items with words that begin with the letter "T." This also means that the filtered list of items 202 omits those items in the original list of items 102 that do not contain words that begin with the letter "T." Further note that the LNM presents the filtered list of items 202 in the same order in which the items appear in the original list of items 102. A user may scroll up and down to view the complete list of filtered items. But for the purposes of explanation it will be assumed that the last item in the filtered list 202 corresponds to the last item shown in FIG. 2, namely the program title "Villanova Plays Toledo-"

Further note that the LNM can optionally present a visual indicator 204 in the filtered list 202 which conveys the fact that the filtered list 202 omits one or more items from the original list of items 102. Consider the exemplary case of items that have been omitted between the program titles "Smart Thinking about Your Ivestments" and "Take is Care of My Heart." The LNM presents a visual indicator 204 in the gap between these two titles to represent that the original list 102 includes additional items that are omitted from the filtered list 202, and that, based on the ordering scheme that is employed, these omitted items would appear in the gap but for their failure to meet the search selection. According to another optional feature, the LNM produces the visual indicator 204 such that it visually conveys a number of items that are missing. For example, there are five missing items between the titles "Smart Thinking About Your Investments" and "Take Care of My Heart." Accordingly, the visual indicator 204 presents five dots to represent these five missing items. As will be explained below, the LNM can employ many other user interface strategies to convey the omission of items.

The user may navigate up and down through the filtered list 202 by making navigation selections. Any kind of input mechanism or combination of input mechanisms can be used to receive navigation selections (as will be described more fully in the next section). Assume for the purposes of explanation here that the user is currently "parked" on a current focus item 206, meaning that the user has navigated to the current focus item 206. The LNM can visually demarcate the current focus item 206 in conventional fashion, such as by highlighting this item 206, drawing a box around this item 206, depicting this item 206 in a different color than the other items, and so forth. When a user makes a navigation selection, the LNM advances the user to a new current focus item, also referred to as a target item because it is the target (or intended destination) of the user's selection.

Figure 3:
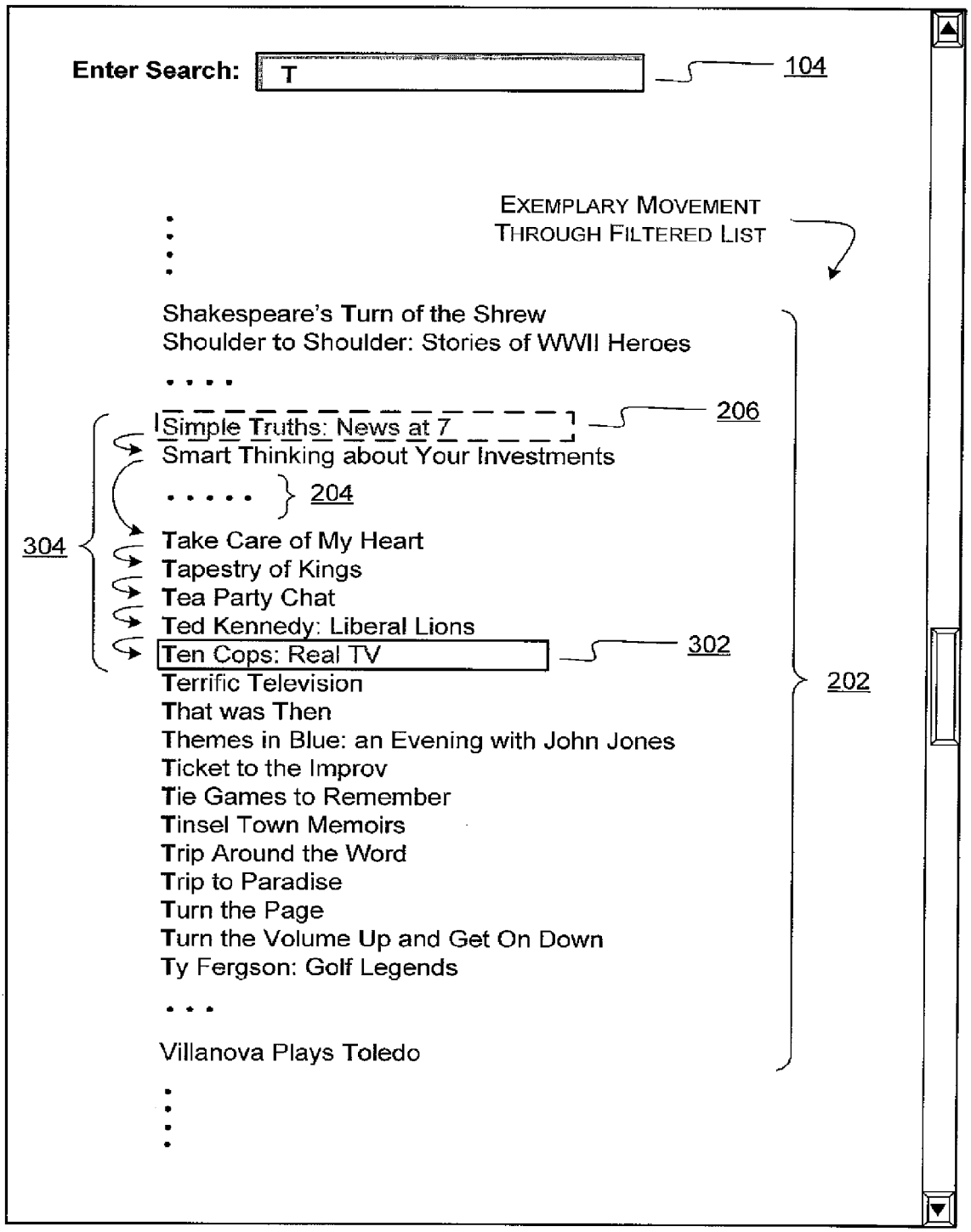
FIG. 3 shows a manner in which a user can navigate within the filtered list of items of FIG. 2 in a first direction, in which navigation advances only among members of the filtered list.
Figure 4:
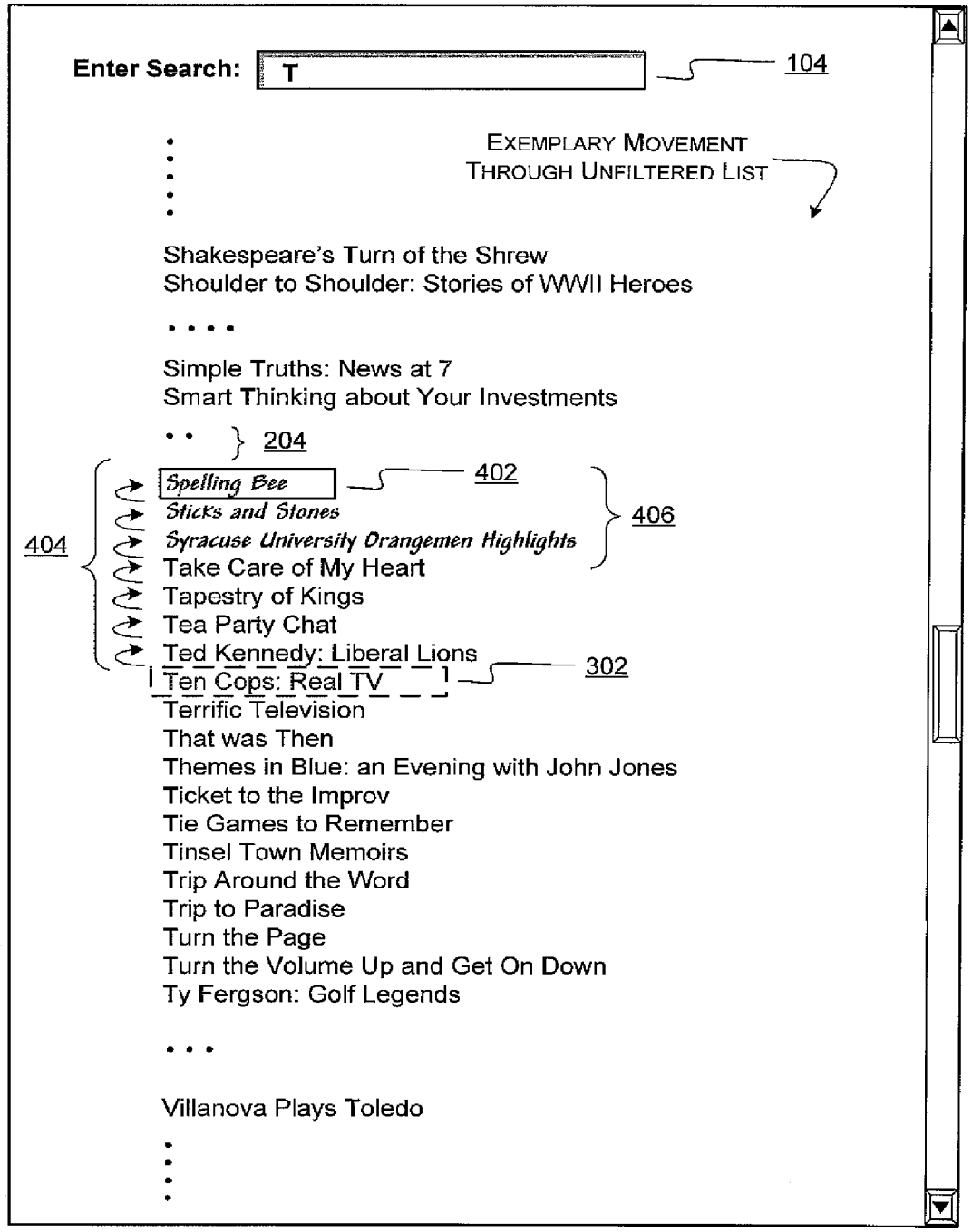
FIG. 4 shows a manner in which the user may navigate within the filtered list of items of FIG. 2 in a second direction, in which navigation advances among items of the original list, independent of whether these items are members of the filtered list.
Figure 5:
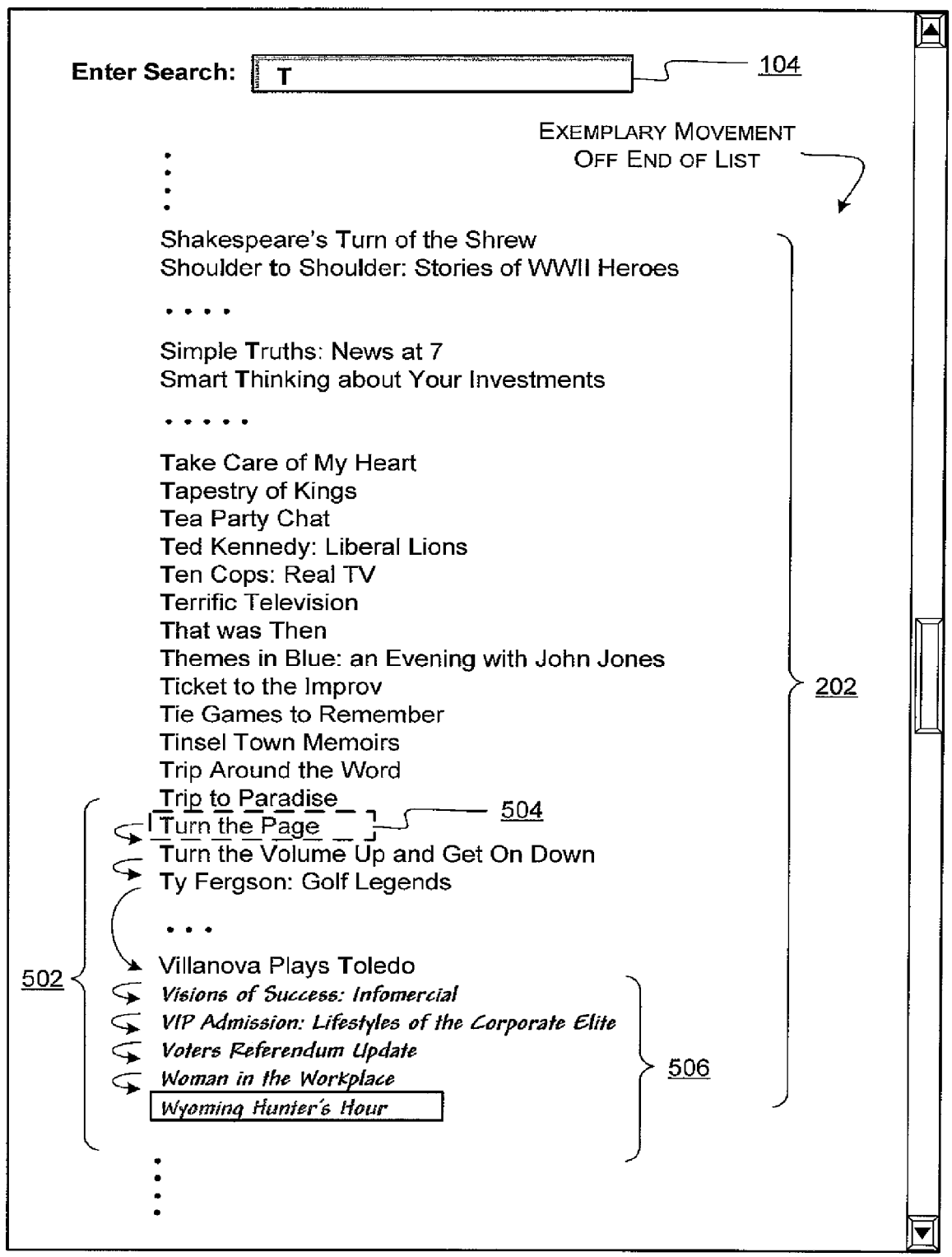
FIG. 5 shows a manner in which the user may navigate past the end of the filtered list of items of FIG. 2, in which navigation advances among items of the original list, independent of whether these items are members of the filtered list.

FIGS. 3, 4, and 5 illustrate the basic manner in which the LNM allows a user to navigate through the filtered list 202. Beginning with FIG. 3, assume that the user begins by making navigation selections of a first kind. Navigation selections of the first kind instruct the LNM to move through items in the filtered list 202, skipping over items in the original list 102 that are not also members of the filtered list 202.

For example, assume that the user enters a series of navigation selections of the first kind to move from the previous current focus item 206 to a new current focus item 302. This results in navigation behavior 304, in which the LNM successively steps from the previous current focus item 206 to the new current focus item 302. Of particular interest in this behavior 304 is the fact that the LNM skips over the five omitted items from the original list of items 102 when advancing from the title "Smart Thinking about Your Investments" to the title "Take Care of My Heart." As explained above, the LNM can optionally represent the fact that the original list 102 includes these five additional items using the visual indicator 204.

Advancing to FIG. 4, now assume that the user enters navigation selections of a second kind to successively move from the current focus items 302 (of FIG. 3) to a new current focus item 402 (of FIG. 4). Navigation selections of the second kind instruct the LNM to move through items in the original list 102, independent of whether these items are also members of the filtered list 202. This results in navigation behavior 404.

In this behavior 404, the LNM first successively steps the user upward through the list, visiting each member of the filtered list 202, until the user reaches the title "Take Care of My Heart." At this point, when the user enters another navigation selection of the second kind, the LNM advances to the next item in the original list 102, which is "Syracuse University Orangemen Highlights," even though this entry does not appear in the filtered list 204. Note that, as a result of this navigation selection, the LNM reveals the missing entry ("Syracuse University Orangemen Highlights") by displaying it in its proper position, with respect to the ordering established by the original list 102.

According to the behavior 404, the user makes two more navigation selections of the second kind, resulting in, in total, the display of three new items 406 that were not is part of the filtered list 202 as originally presented to the user. Once these new items 406 are displayed, they effectively become members of the filtered list 202. As a consequence, if the user now makes a navigation selection of the first kind to move down the list from the title "Spelling Bee," the LMN will advance the user to the title "Sticks and Stones" even though this item was not in the filtered list 202 as originally presented to the user.

In one exemplary implementation, the visual indicator 204 shown in FIGS. 2 and 3 can change as a result of navigation selections of the second kind. For example, in those cases in which the visual indicator 204 also conveys the number of omitted items, the visual indicator 204 will change to indicate that a fewer number of items are now omitted from the current state of the filtered list 202. For example, in the case of FIG. 4, the user has revealed three previously omitted items from the original list 102. As a result, the visual indicator 204 changes from a five-dot display to a two-dot display (indicating that only two items are now omitted).

As can be appreciated by the combination of FIGS. 3 and 4, the LNM allows a user to navigate within the filtered list 202, yet also discover items in the original list 102 that may not currently appear in the filtered list 202. This is advantageous because the user is given a focused list based on the user's presumed interests (in response to the search selection), but the user is not thereby bound to or blinkered by the focused list. The user can efficiently extend the scope of the filtered list by making navigation selections of the second kind, while not otherwise abandoning the focused list.

Advancing to FIG. 5, this user interface presentation illustrates a third kind of navigation behavior 502. In this behavior 502, the user moves from a focus item 504 to the bottom of the filtered list 202, represented by the title "Villanova Plays Toledo." This navigation can be performed by entering any kind of selection (e.g., of the first kind, second kind, or some other kind). Now assume that the user enters a navigation selection which instructs the LNM to move further down in the list, to items in the original list 102 that are not currently displayed in the filtered list 202. This prompts the LNM to successively reveal items in the original list 102 each time a navigation selection is received. FIG. 5 shows that a total of five new items 506 have been revealed in response to the user making five navigation selections to advance beyond the end of the list. As stated before, once these items are revealed, they effectively become members of the filtered list of items 202 and the user can navigate among these members as if they matched the initial search selection.

In the above examples, the LNM reveals an omitted item in response to a navigation selection of the second kind by adding this item to the filtered list 202, which is displayed to the user. In an alternative implementation, the LNM can reveal the omitted item in a manner such that its display is transitory, meaning, for instance, that it will be displayed but will eventually disappear. A fade special effect can be applied here to gradually remove the omitted item once it is displayed. This may be considered desirable in some applications to avoid permanently cluttering the filtered list 202 with items that do not meet the search selection, yet still revealing the omitting items when requested. In a variation of this concept, the user may be given the ability to expressly control the removal of items that are added to the filtered list 202, e.g., by activating a "return to original filtered list" command, or the like.

In another alternative implementation, the LNM can reveal an omitted item when requested by displaying it in some location other than its proper place within the original list of items 102. For example, the LNM can display the omitted item (when requested) in a separate window, in a margin area of the user interface presentation, in a footnote-type region of the user interface presentation, and so on.

A.2. Alternative Ways of Representing Omitted Items (FIGS. 6-8)

FIGS. 6-8 show three alternative ways of indicating that the filtered list of items 202 does not represent all of the items in the original list of items 102. While only three alternative strategies are illustrated, those skilled in the art will appreciate that many other strategies can be used.

FIG. 6 shows an example in which the LNM displays the omitted items in a different format than the items in the filtered list 202. For example, as shown, the omitted items can be displayed in a smaller font than the items in the original list 102. Or the omitted items can be displayed in a different color than the filtered items. Or the omitted items can be displayed with reduced intensity compared to the filtered items (e.g., by adjusting the gray level of the filtered items), and so on.

FIG. 7 shows an example in which the LNM presents a bar chart graphic or other kind of graphic that conveys the number of original items that have been omitted from the filtered list of items 202.

FIG. 8 shows an example in which the LNM entirely omits any item that is not a member of the filtered list 202. In this case, the user may be unaware from looking at the list 202 that it contains omissions, but when the user enters input instructions of the second kind, the LNM can reveal one or more omitted items.

Again, still other strategies can be used to convey the fact that items have been omitted from the filtered list of items 202.

A.3. Other Applications of the LNM (FIGS. 9 and 10)

The LNM can be applied to navigate within other kinds of search spaces. For example, the previous examples presented a one-dimensional list of ordered items. But, as shown in FIG. 9, the LNM can be applied to search spaces that possess multiple search axes. In this example, a first axis 902 of search corresponds to a list of restaurant names. A second axis 904 of search corresponds to a list of menu items. Thus, for a particular restaurant in the first list, the horizontal list of items associated with this entry presents the menu items offered by this restaurant.

Figure 9:
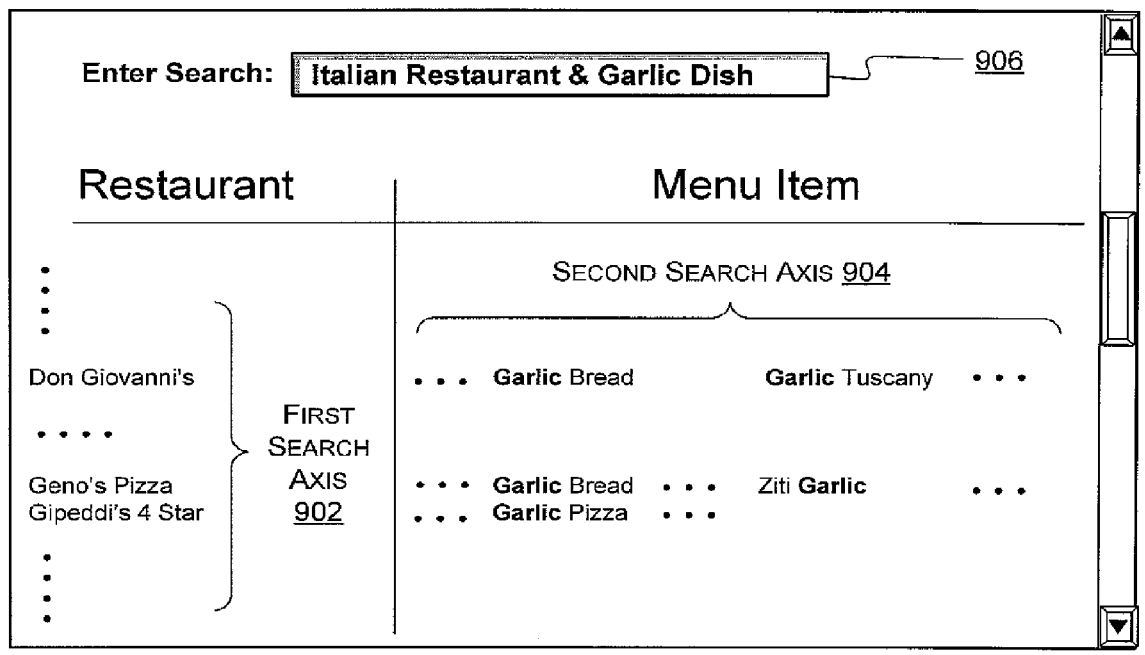
FIG. 9 shows the application of the navigation strategies of FIGS. 1-5 to filtered lists having plural axes.

In the scenario shown in FIG. 9, the user has entered the search selection "Italian Restaurant and Garlic Dish" via the user input interface 906. This prompts the LNM to generate a list of restaurants that can be grouped in the Italian genre. In addition, the LNM filters the menu offerings from these Italian restaurants to show only the dishes that prominently feature garlic. In the manner described above, the user can use navigation selections of a first kind to move among the filtered list of restaurants and to move among the filtered lists of menu items. The user can use the navigation selections of the second kind to expand the filtered list by revealing restaurants that did not meet the initial search selection, and by revealing dishes that also did not meet the initial search selection.

Figure 10:
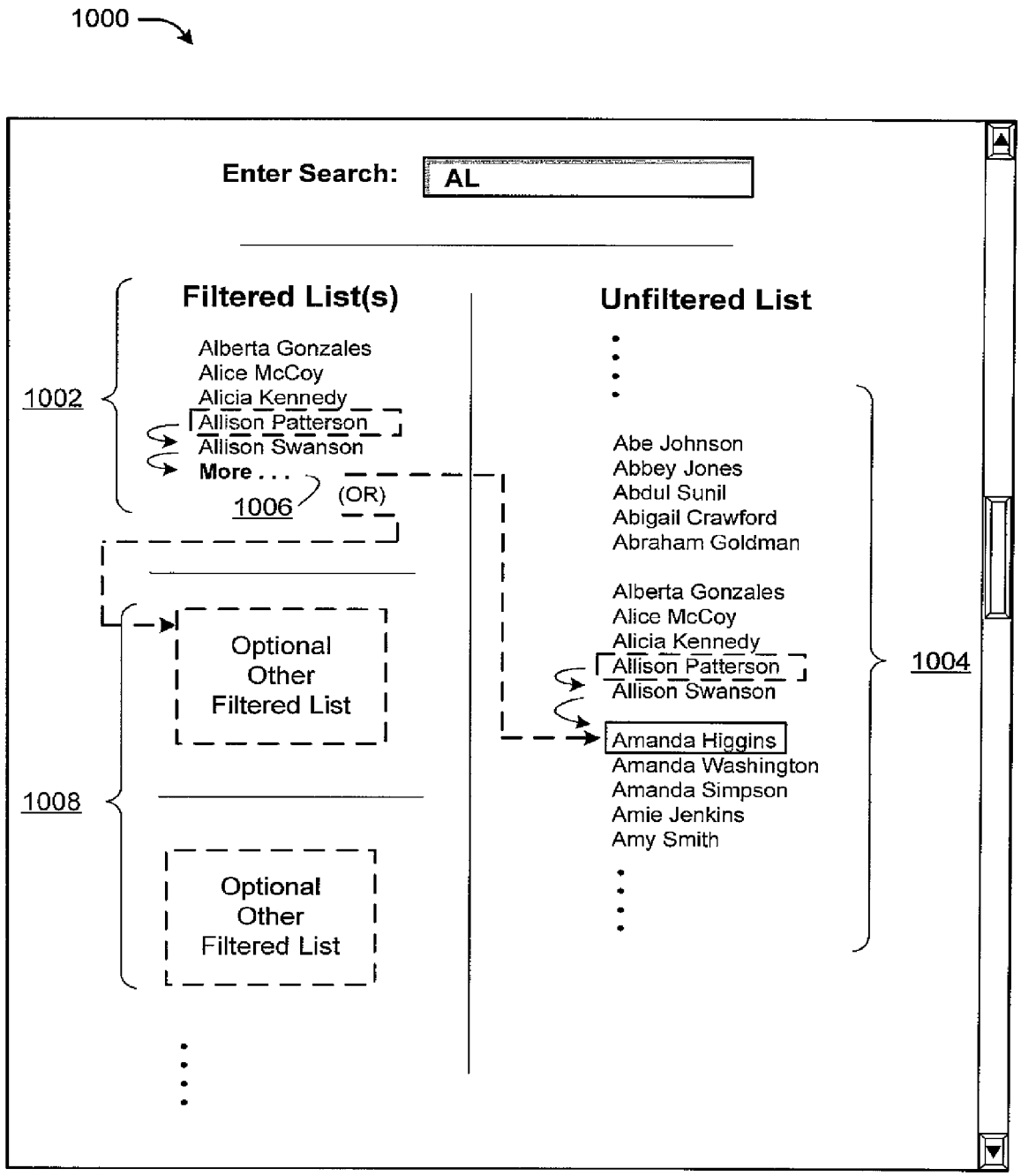
FIG. 10 shows the application of the navigation strategies of FIGS. 1-5 to another type of search environment.

FIG. 10 shows another exemplary application of the LNM. In this case, a user interface presentation 1000 can show both a filtered list 1002 and an unfiltered (i.e., original) list 1004 in separate "buckets." In one use scenario, the user's movement through the filtered list 1002 is paralleled by a linked movement through the unfiltered list 1004. That is, as the user moves from the name "Allison Patterson" to "Allison Swanson" in the filtered list 1002, the LNM can change the focus from the name Allison Patterson to Allison Swanson in both the filtered list 1002 and the unfiltered list 1004. (Focus can be conveyed by highlighting a name, drawing a box around a name, and so on.) Since movement in the filtered list 1002 is linked to movement in the unfiltered list 1004, the user can be conveniently apprised of both the local and global contexts of his or her navigation operations.

Figure 11:
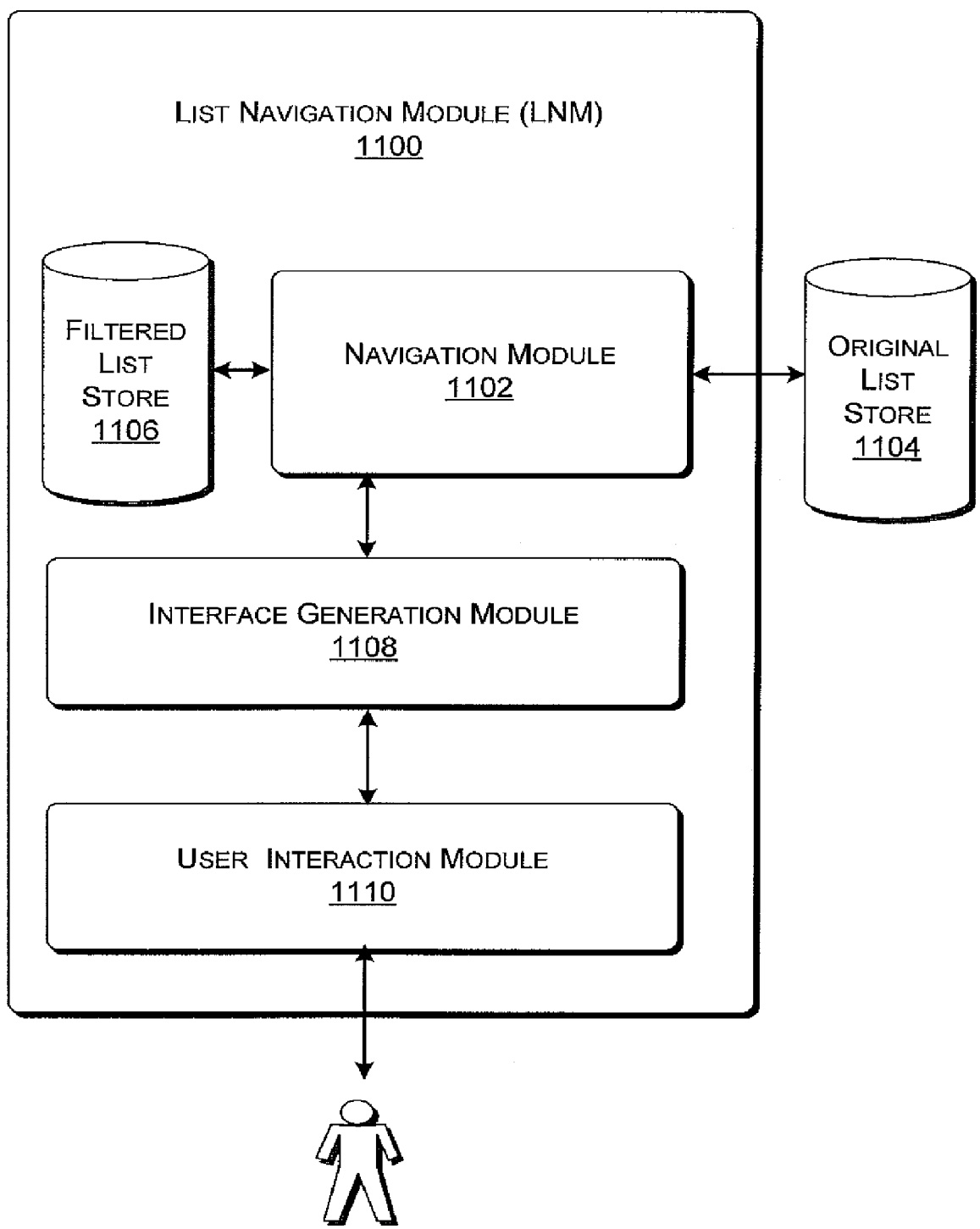
FIG. 11 shows an exemplary list navigation module (LNM) for implementing the user interface behavior of FIGS. 1-9.

As another optional feature, the LNM can allow the user to move beyond the scope of the filtered list 1002 to navigate exclusively within the unfiltered list 1004. One way that this can be accomplished is through the navigation mechanism described above (where the user actuates a special navigation key or command to navigate within the unfiltered list 1004). A "More . . . " command 1006 shown in FIG. 11 provides another way to advance from the filtered list 1002 to the unfiltered list 1004. When the user activates the "More . . . " command 1006, the LNM allows the user to navigate beyond the end of the filtered list 1002 into the unfiltered list 1004.

As another optional feature, the LNM can present plural filtered lists, including optional additional filtered lists 1008. The filtered lists (1002, 1008) can be displayed in separate buckets. The filtered lists (1002, 1008) may match the entered search term in different capacities. For example, if the user enters the search term "AL," then a first filtered list (1002) can present a list of names having first names which begin with "AL," while a second filtered list (not shown) could present a list of names having family names which begin with "AL," and so forth. In this context, in response to the user's actuation of the "More . . . " command 1006, the LNM may advance from the first filtered list to the second filtered list. This movement can also be tracked by corresponding movement in the unfiltered list 1004. Still other permutations of the navigation behavior described above can be implemented.

FIGS. 9 and 10 are merely representative of a few of many possible alternative applications of the LNM.

B. Exemplary System (FIGS. 11-16)

Generally, any of the functions described with reference to the figures can be implemented using software, hardware (e.g., fixed logic circuitry), manual processing, or a combination of these implementations. The term "logic", "module" or "functionality" as used herein generally represents software, hardware, or a combination of software and hardware that can be configured to implement prescribed functions. For instance, in the case of a software implementation, the term "logic," "module," or "functionality" represents program code (and/or declarative-type instructions) that performs specified tasks when executed on a processing device or devices (e.g., CPU or CPUs). The program code can be stored in one or more computer readable memory devices.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

B.1. Exemplary List Navigation Module (LNM) (FIG. 11)

FIG. 11 shows an exemplary composition of a list navigation module (LNM) 1100. As explained above, the purpose of the LNM 1100 is to navigate among a list of ordered items, by allowing a user to investigate both items in a filtered list of items 202 and also an original list of items 102.

The LNM 1100 includes a navigation module 1102 that executes the core navigation behavior described in Section A. The navigation module 1102 can act on items stored in an original list store 1104. The original list store 1104 can store the original list of items 1102. The navigation module 1102 generates the filtered list 202 of items in response to search selections and navigation selections made a user. A filtered list store 1106 can store the filtered list 202. The filtered list 202 in the filtered list store 1106 may evolve as the user makes navigation selections. In actual implementation, the filtered list of items 202 can be maintained as a distinct list of items from the original list of items 102, or can represent attribute information or flags associated with items in the original list of items 102. The attribute information or flags instruct the LNM 1100 concerning which items in the original list of items 102 should be presented to provide the filtered list of items 202.

The LNM 1100 can also include an interface generation module 1108 which formats the lists in the stores (1104, 1106) into the desired user interface presentations (described in Section A above).

Finally, the LNM 1100 can also include a user interaction module 1110 which allows a user to interact with the user interfaces created by the interface generation module 1108.

B.2. Overview of Exemplary Systems that Incorporate the LNM (FIGS. 12-14)

The LNM 1100 described above can be employed in many different environments.

Figure 12:
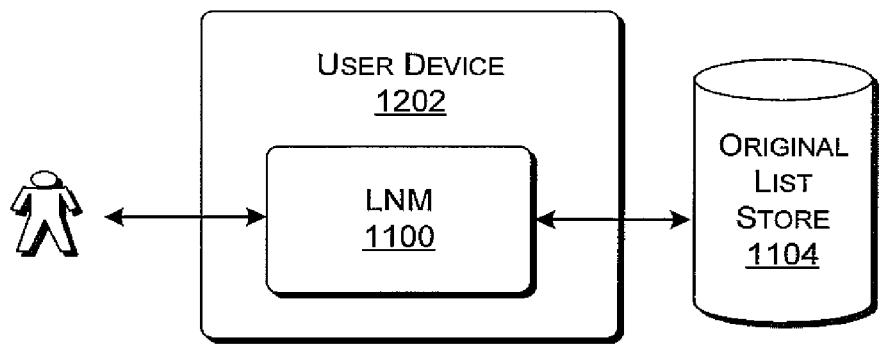
FIG. 12 shows one exemplary standalone system that can incorporate the LNM of FIG. 11.

In the case of FIG. 12, the LNM 1100 is used in a local standalone setting to navigate among items that are locally archived in the original list store 1104. In this case, for instance, the LNM 1100 can be implemented by a personal computer, a personal 16 digital assistant, a set top box, a digital video recorder (DVR), a mobile telephone device, a game console, and so on.

Figure 13:
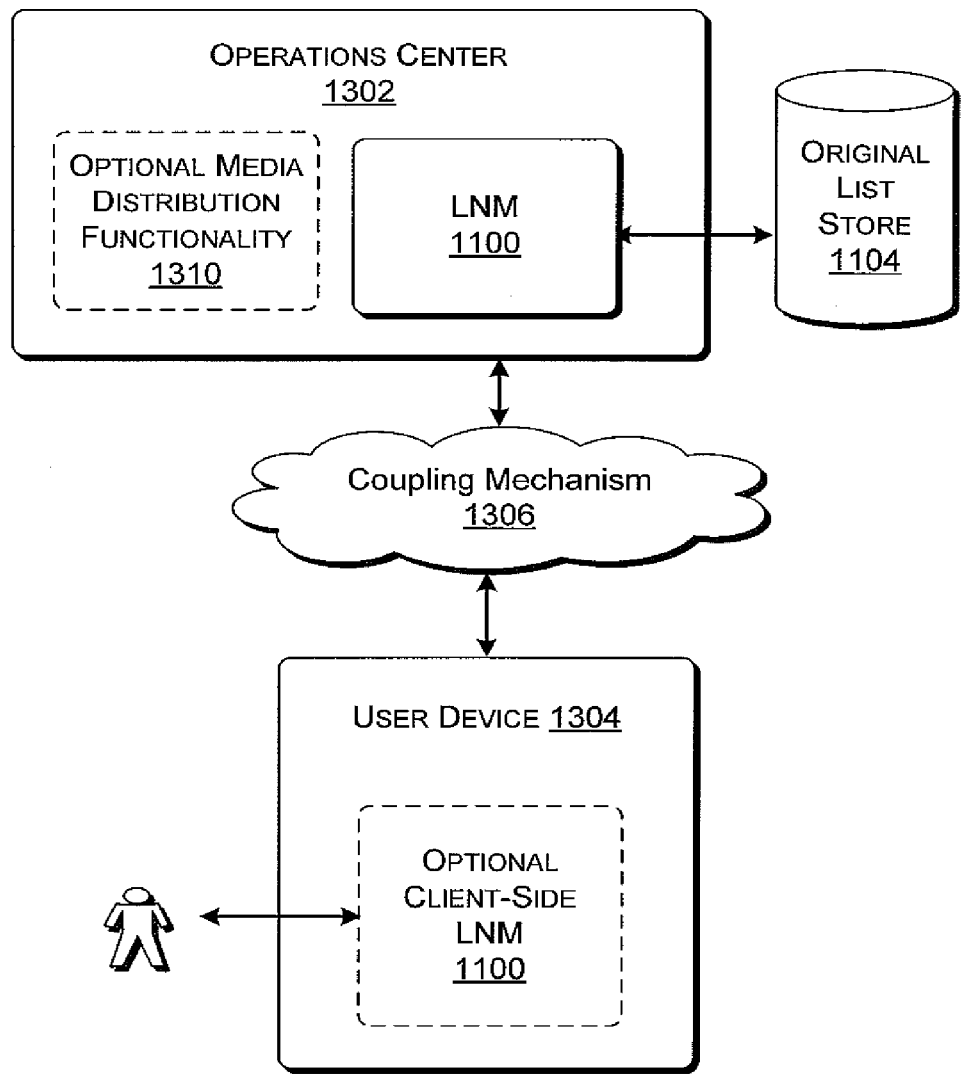
FIG. 13 shows one exemplary networked system that can incorporate the LNM of FIG. 11.
Figure 14:
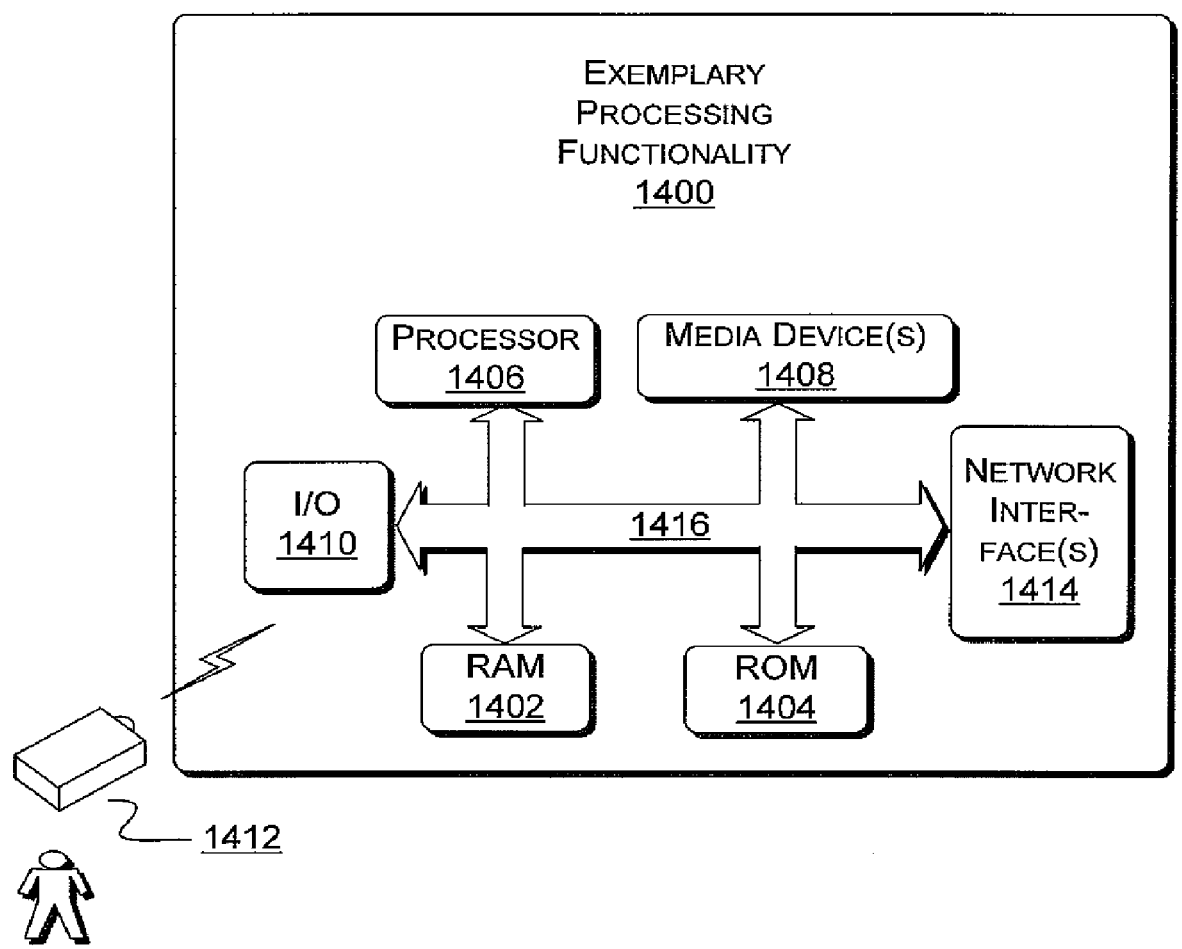
FIG. 14 shows exemplary processing functionality that can be used to implement is any aspect of the systems of FIGS. 12 and 13.

In the case of FIG. 13, the LNM can be used in a network environment in which an operations center 1302 interacts with a user device 1304 via any kind of network coupling mechanism 1306 (such as a LAN, the Internet, and so on). For instance, the LNM 1100 can be deployed as part of a search engine furnished by the operations center 1302 to navigate among the original list of items 102. (The original list of items 102 can also optionally be stored at the operations center level.) Alternatively, or in addition, the user device 1304 can also incorporate aspects of the LNM 1100 to execute the above-described navigation behavior on a local level. (In this scenario, the original list of items 102 can also optionally be stored at the local level, instead of, or in addition to, storage at the operations center level). The operations center 1302 can be implemented by one or more server computers, located at a single site or distributed over plural sites. The user device 1304 can be implemented in the manner described in FIG. 12 as a personal computer, a personal digital assistant, a set top box, a digital video recorder (DVR), a mobile telephone device, a game console, and so on.

In one type of networked environment shown in FIG. 13, the operations center 1302 can include media distribution functionality 1310. This functionality 1310 can deliver streams of media information to the user device 1304. In this environment, the LNM 1100 can be used to assist the user in selecting media programs to be sent to the user device 1304. For instance, the LNM 1100 can be integrated with a search mechanism that allows a user to select video-on-demand (VOD) assets from a library of such assets. Or the LNM 1100 can be integrated with an electronic program guide (EPS) mechanism that allows the user to select programs from an EPG listing of programs.

Still other applications and implementations of the LNM 1100 are possible.

Various components of the systems shown in FIGS. 12 and 13 can be implemented by processing equipment, such as the user devices (1202, 1304) of FIGS. 12 and 13, any aspect of the operations center 1302 of FIG. 13, and so on. FIG. 14 shows a general depiction of processing functionality 1400 that can be used to implement any of these devices or modules.

The processing functionality 1400 can include various volatile and non-volatile memory, such as RAM 1402 and ROM 1404, as well as one or processing devices 1406. The memory (1402, 1404) can store instructions which perform the various functions described above when executed by the processing devices 1406. The processing functionality 1400 also optionally includes various media devices 1408, such as a module for reading and writing information to a hard disk, and so forth. The processing functionality 1400 also includes an input/output module 1410 for receiving various inputs from the user, and for providing various outputs to the user. In the particular case of a media distribution environment, the user can interact with the input/output module 1410 using a remote control device 1412. The output devices that interact with the input/output module 1410 can include any kind of display device, printer, audio output device, and so forth. The processing functionality 1400 can also include one or more interfaces 1414 for exchanging data with other devices via a network. One or more buses 1416 communicatively couples the above-described components together.

In various applications, the processing functionality 1400 shown in FIG. 14 can include additional modules or can omit one or more of the modules shown in FIG. 14.

B.3. Exemplary Input Mechanisms

As discussed above, a first kind of navigation selection can move the user through the filtered list of items 202, while a second kind of navigation selection can move the user through the original list of items 102 independent of whether these items are members of the filtered list of the items 202. Different types of input mechanisms can be used to generate the navigation selections of the first and second kind.

Figure 15:
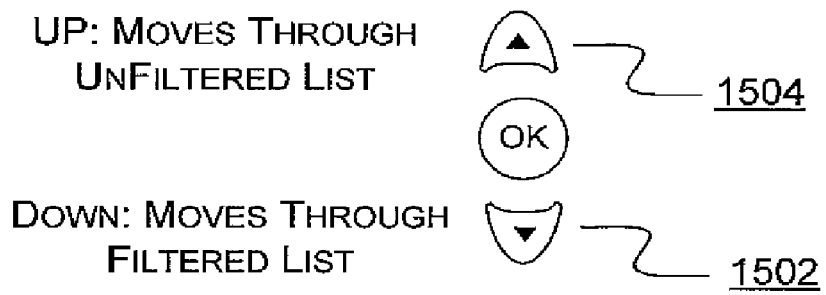
FIGS. 15 and 16 shows two exemplary input mechanisms for making navigation selections that govern the behavior of the LNM of FIG. 11.

Consider the input mechanism shown in FIG. 15. In this case, a down arrow button 1502 can be used to move the user through the filtered list of items 202 (thus producing navigation selections of the first kind), while an up arrow button 1504 can be used to move the user through the unfiltered list of items 102 (thus producing navigation selections of the second kind), or vice versa. These buttons (1502, 1504) may correspond to physical buttons located on an input device, such as up and down arrows located on a remote control device. Or these buttons may correspond to graphic command buttons displayed on a user interface presentation, through which the user interacts in conventional fashion, e.g., via remote control device, mouse device, keyboard, etc.

Figure 16:
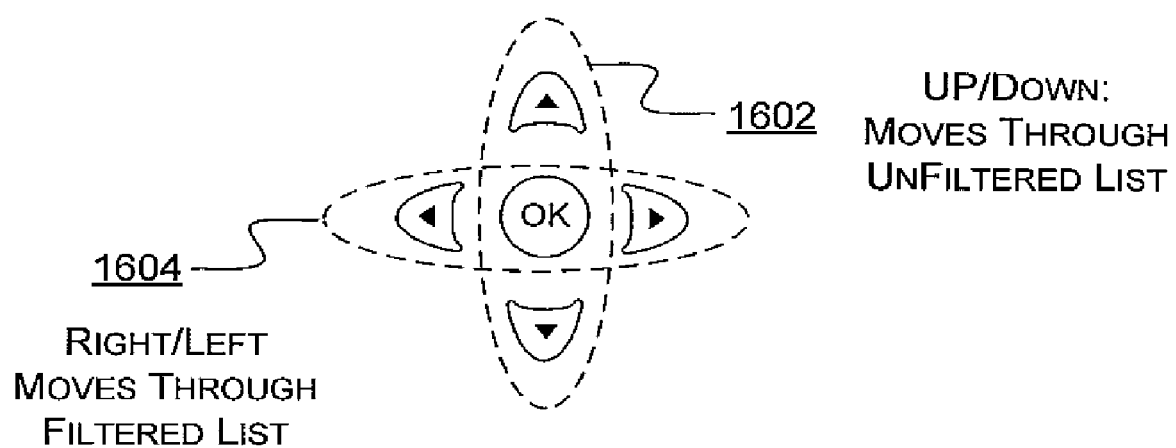

In the case of FIG. 16, an input mechanism uses a first collection of up/down buttons 1602 to move both up and down within the filtered list of items 202 (to produce input selections of the first kind). The input mechanism uses a second collection of up/down buttons 1604 to move both up and down within the unfiltered list of items 102 (to produce input selections of the second kind).

Still other techniques can be used to make navigation selections of the first and second kinds. For instance, an input mechanism can include an up/down pair of buttons for moving up and down within the filtered list 202. But when the user "holds down" these buttons for a sufficiently long time, the instruction generated thereby allows the user to navigate through the original list 102. Still alternatively, the LNM can use multiple category-type keys associated with different filtered lists. For example, assume that a user enters a search selection which instructs the LNM to present a filtered list of movie titles that feature either artist A or artist B. A first input mechanism can be used to move through the items that feature artist A, a second input mechanism can be used to move through the items that feature artist B, and a third input mechanism can be used to move through the original list regardless of whether the items are also members of the filtered list.

C. Exemplary Method of Operation (FIG. 16)

Figure 17:
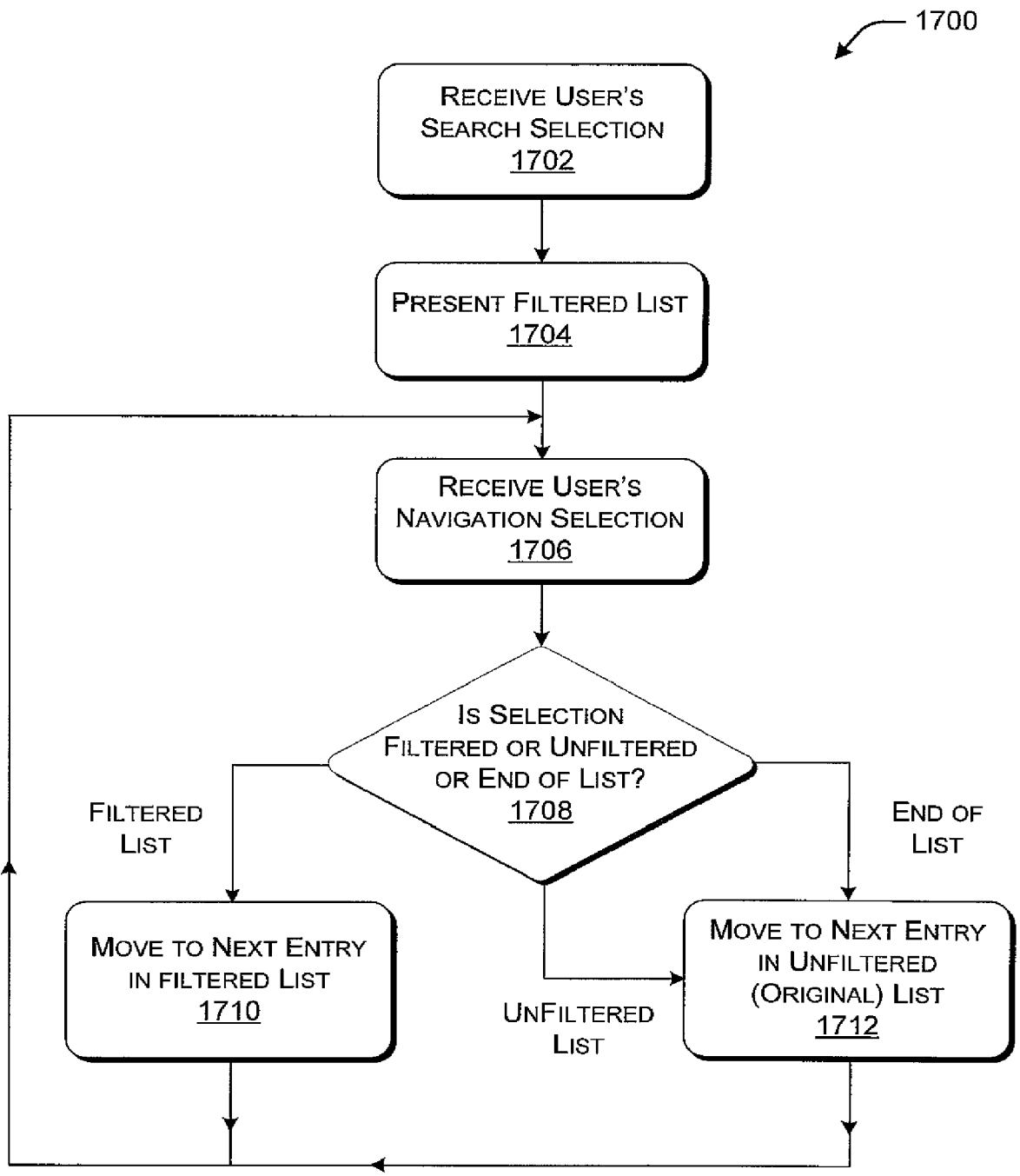
FIG. 17 shows an exemplary procedure that explains the operation of the LNM of FIG. 11.

FIG. 17 shows a procedure 1700 which explains the operation of the LNM in flowchart form. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained in prior sections, Section C will serve primarily as a review of those functions.

In step 1702, the LNM 1100 receives the user's search selection.

In step 1704, the LNM 1100 presents a filtered list of items 202 which satisfy the search selection.

In step 1706, the LNM 1100 receives the user's navigation selection to navigate within the filtered list 202.

In step 1708, the LNM 1100 determines whether the kind of navigation selection corresponds to the first above-described kind or the second above-described kind, or whether the user is attempting to navigate off the end of the filtered list 202.

In step 1710, if the navigation selection corresponds to the first kind of selection, the navigation proceeds by stepping through items in the filtered list 202, excluding items in the original list 102 that are not also members of the filtered list 202.

In step 1712, if the navigation selection corresponds to the second kind of selection (or the user is attempting move off the end of the filtered list 202), then the LNM 1100 steps through the unfiltered list. This may results in items that did not match the initial search selection being added to the filtered list of items 202.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computerized method for navigating among items in lists of items, wherein the method is implemented at least in part by a processor executing instructions stored in computer readable storage media, the method comprising:

presenting an original list of items by displaying the original list of items on a user interface, the original list comprising a plurality of items displayed according to a particular order;

applying, by the processor, a filter to the original list of items to derive a subset comprising a plurality of the items from the original list for producing a filtered list of items from the original list of items;

presenting the filtered list of items by displaying the filtered list of items on the user interface in a same order as the particular order of the original list of items, wherein the filtered list of items is displayed in place of the original list of items;

displaying a visual indicator with the filtered list of items, wherein the visual indicator is located between two particular items displayed in the filtered list of items, wherein the visual indicator indicates a number of items from the original list that were located between the two particular items in the original list and that are omitted from the filtered list at the location of the visual indicator;

receiving, by the processor, a navigation selection via a user input device; and navigating a focus among the filtered list of items based on the navigation selection;

for a navigation selection of a first kind, advancing the focus from a first item of the filtered list to a second item of the filtered list; and for a navigation selection of a second kind that includes an instruction for navigating the focus to the location of the visual indicator, displaying an additional item in the filtered list adjacent to the location of the visual indicator as a result of the instruction for navigating the focus to the location of the visual indicator, the additional item displayed in the filtered list being in the original list, but being omitted from the subset of items derived by applying the filter to create the filtered list, wherein:

the navigation selection of the second kind causes the additional item to be added as a new member of the filtered list when the additional item was not previously a member of the filtered list, the displaying of the additional item causes the visual indicator to be reduced by a value of one to indicate that one fewer item from the original list is omitted from the filtered list at the location of the visual indicator, and following displaying the additional item, the visual indicator indicates the number of items from the original list omitted from the filtered list between the additional item and one of the particular items.

2. The computerized method of claim 1, wherein:

the addition of the additional item to the filtered list is transitory, and a fade effect is applied to the additional item to gradually remove the additional item from the filtered list after the addition and display thereof to avoid permanently cluttering the filtered list with items that do not meet criteria of the filter.

3. The computerized method of claim 1, further comprising, for another navigation selection of the second kind that includes an instruction for navigating the focus again to the location of the visual indicator, displaying a second additional item in the filtered list adjacent the location of the visual indicator as a result of the instruction for navigating the focus to the location of the visual indicator, the second additional item displayed in the filtered list being in the original list, but omitted from the subset of items derived by applying the filter to create the filtered list, wherein:

the second additional item is displayed as a member of the filtered list, and the displaying of the second additional item causes the visual indicator to be further reduced by an additional value of one to indicate that one fewer item from the original list is omitted from the filtered list.

4. The computerized method of claim 1, wherein the original list of items and the filtered list of items are displayed in alphabetical order as the particular order.

5. The computerized method of claim 1, wherein the filtered list of items is produced by:

receiving a search selection; and culling the filtered list of items from the original list of items, wherein each member of the filtered list of items satisfies the search selection and items of the original list that do not satisfy the search selection are omitted from the filtered list of items.

6. The computerized method of claim 5, wherein:

the items in the original list are expressed in alphanumeric characters, the search selection comprises at least one alphanumeric character, the filtered list of items comprises items that include said at least one alphanumeric character, and items of the original list that are omitted from the filtered list of items do not include said at least one alphanumeric character.

7. The computerized method of claim 6, wherein:

items in the original list include attributes associated therewith, the search selection comprises at least one attribute, the filtered list of items comprises items that include said at least one attribute associated therewith, and items of the original list that are omitted from the filtered list of items do not include said at least one attribute associated therewith.

8. The computerized method of claim 1, wherein the navigation selection of the first kind comprises an input instruction to navigate the focus in a first navigable direction, and the navigation selection of the second kind comprises an input instruction to navigate the focus in a second navigable direction.

9. The computerized method of claim 1, wherein:
the visual indicator is displayed between the two particular items in the filtered list of items as one or more items of the original list that were originally located between the two particular items in the original list,
the items displayed as the visual indicator are displayed in a reduced font size compared with a font size of the items in the filtered list so that the items displayed in the visual indicator are distinguished from the items in the filtered list, and
when the focus is instructed navigate to the visual indicator using the navigation selection of the second kind, one of the one or more items in the visual indicator is replaced with the item from the original list in a font size that matches the font size of the items in the filtered list.

10. The computerized method of claim 1, wherein:
the visual indicator is displayed between the two particular items in the filtered list of items as one or more symbols, and
each of the one or more symbols corresponds to one of the one more items from the original list of items that has a position within the original list of items between the two particular items, but is omitted from the filtered list of items.

11. The computerized method of claim 1, wherein:
the visual indicator is displayed between the two particular items in the filtered list of items as a bar graph including a number, and
the bar graph and the number correspond to how many items from the original list of items had a position within the original list of items between the two particular items, but are omitted from the filtered list of items.

12. The computerized method of claim 1, wherein:
for a navigation selection that comprises an instruction to advance the focus beyond an end item of the filtered list of items, the instruction for navigating the focus beyond the end item causes display of a subsequent member of the original list at the focus located adjacent to the end item, the subsequent member having been located after the end item of the filtered list in the original list and forming a new end item of the filtered list, and
the subsequent member of the original list that is displayed is not a member of the subset derived for creating the filtered list of items.

13. One or more machine-readable storage media containing machine-readable instructions for implementing the computerized method of claim 1.

14. A list navigation module stored in machine-readable storage media including logic configured to implement the computerized method of claim 1.

15. A computer program product comprising a computer-readable storage medium having computer-readable program code embodied thereon, the computer-readable program code adapted to be executed to implement a computerized method for navigating among items in lists of items, the method comprising:
receiving a search selection that is applied to an original list of items;
culling and presenting a filtered list of a plurality of items taken as a subset from the original list of items, wherein each member of the filtered list of items satisfies the search selection, the filtered list of items being presented in a same order as the original list of items;
presenting a visual indicator that indicates how many items from the original list of items are omitted from the filtered list of items at a location of the visual indicator, the visual indicator being located between two particular items in the filtered list of items in place of items from the original list that are omitted from the filtered list of items between the two particular items;
receiving a navigation selection; and
navigating a focus among the filtered list of items based on the navigation selection, wherein:
for a navigation selection that navigates the focus to the visual indicator, automatically displaying an additional item as part of the filtered list adjacent to the visual indicator as a result of receiving the navigation selection to navigate the focus to the visual indicator, the additional item having been located between the two particular items in the original list, thereby causing the additional item to be added as a new member of the filtered list, and
the displaying of the additional item causes the visual indicator to be reduced by a value of one to indicate that one fewer item from the original list is omitted from the filtered list at the location of the visual indicator.

16. The computer program product according to claim 15, the method further comprising, for a navigation selection that comprises an instruction to advance the focus beyond an end item of the filtered list of items:
adding, to the filtered list, an omitted item from the original list that was located beyond the end item in the original list; and
displaying the omitted item at the end of the filtered list as a new location of the focus for including the omitted item in the filtered list as a new end item.

17. The computer program product according to claim 15, wherein:
the visual indicator is displayed between the two particular items in the filtered list of items as one or more symbols, and
each of the one or more symbols corresponds to one of the one more items from the original list of items that has a position within the original list of items between the two particular items, but is omitted from the filtered list of items.

18. A system comprising:
one or more processors coupled to computer-readable storage media;
a list navigation module, maintained on the computer-readable storage media and executed on the one or more processors to:
present a user interface presentation of a filtered list of a plurality of items taken as a subset from an original list of items, wherein each member of the filtered list of items satisfies a search selection and the filtered list of items is presented in an order corresponding to an order of the original list of items;
present a visual indicator that indicates how many items from the original list of items are omitted from the filtered list of items at a location of the visual indicator, the visual indicator being located between two particular items in the filtered list of items in place of items from the original list that are omitted from the filtered list of items between the two particular items;
in response to receiving a navigation selection, navigate a focus among the filtered list of items based on the navigation selection; and for a navigation selection that navigates the focus to the visual indicator:
  automatically display an additional item as part of the filtered list adjacent to the visual indicator as a result of receiving the navigation selection to navigate the focus to the visual indicator, the additional item having been located between the two particular items in the original list, the navigation causing the additional item to be added as a new member of the filtered list; and
  reduce the visual indicator by a value of one to indicate that one fewer item from the original list is omitted from the filtered list at the location of the visual indicator.

19. The system according to claim 18, wherein, for a navigation selection that comprises an instruction to advance the focus beyond an initial end item of the filtered list of items, the list navigation module is further configured to:
  add, to the filtered list, an omitted item from the original list that was located beyond the initial end item in the original list, and
  display the omitted item at the end of the filtered list as a new location of the focus for including the omitted item in the filtered list as a new end item adjacent to the initial end item.

20. The system according to claim 18, wherein:
the visual indicator is displayed between the two particular items in the filtered list of items as one or more symbols, and
each of the one or more symbols corresponds to one of the one more items from the original list of items that has a position within the original list of items between the two particular items, but is omitted from the filtered list of items.

\* \* \* \* \*